United States Patent Office 2,694,684
Patented Nov. 16, 1954

2,694,684

LUBRICATING OIL COMPOSITIONS

Dilworth T. Rogers, Summit, and Jeffrey H. Bartlett, Westfield, N. J., assignors to Standard Oil Development Company, a corporation of Delaware No Drawing. Application December 11, 1951, Serial No. 261,152

5 Claims. (Cl. 252—49.8)

This invention relates to novel lubricating oil compositions and to methods of preparing them. More particularly, it relates to the making and using of oil solutions of copolymers of unsaturated phosphonic acid esters with other copolymerizable materials. In particular it has been found that materials of this type exhibit excellent pour depressing characteristics in lubricating oils, and also form valuable additives for fuels, lubricants, greases and the like.

It is the object of the instant invention to prepare lubricating oil compositions having excellent pour points by combining with a lubricating oil a minor proportion of a copolymer formed by copolymerizing an unsaturated phosphoric acid ester containing from about 8 to about 20 carbon atoms in the ester portion thereof with a second monomer which may be broadly described as an unsaturated ester.

It is known in the prior art that polymers of the unsaturated phosphonic acid derivatives may be prepared by various methods. For instance, in United States Patent No. 2,365,466, issued December 19, 1944, to Hamilton, there is disclosed methods of preparing derivatives of alpha, beta-ethylenically unsaturated phosphonic acids. Of the methods generally described the starting materials are disclosed as being dichlorides of a phosphonic acid. Patentee also discloses that derivatives of these unsaturated phosphonic acids may be used as mineral oil additives.

There has also been disclosed to the art a method of preparing copolymers of these phosphonic acid derivatives by copolymerizing with compounds having one vinyl group. In United States Patent No. 2,439,214, issued April 6, 1948, to Richard Lindsey, Jr., the art is taught of the preparation of copolymers of the unsaturated phosphonic acid esters and amides with materials of the type of methacrylate, styrene, ethylene, and the like. The Hamilton patent cited above is mentioned in this latter patent and the specifiction incorporated therein. In Example V of the Lindsey patent there is shown that a polymer formed by copolymerizing 10.2 mols of ethylene per mol of dimethyl 1-propene-2-phosphonate is useful as a pour point depressant. This represents a forward step in the art and is closely related to the instant invention. However, the difference between the instant compounds and the Lindsey materials will be clearly pointed out below.

A preferred type of phosphonic acid used in forming the copolymers of invention contains an ethylene type double bond in the alpha-beta position. Convenient starting materials for use in the preparation of the acids may be (1) aldehydes or ketones and phosphorous trichloride or (2) olefins and phosphorous pentachloride. The following aldehydes and ketones may be employed as starting materials: acetaldehyde, butyraldehyde, octaldehyde, isodecylaldehyde by oxonation of tri-propylene, acetophenone, acetone, methyl ethyl ketone, methyl propyl ketone, methyl cyclohexyl ketone, sterophenone, ketones derived from diisobutylene and acetic anhydride, tri-decanone-2, tricosanone-12, pentadecanone-8, coconut oil ketones, and the like. Ketones derived from wax alkylated aromatics by acylation are also valuable starting materials in the preparation of the products of this invention. Generally, the preparation of the unsaturated phosphonic acid from ketones or aldehydes may follow the steps indicated by the Equations A, B, C, and D given below:

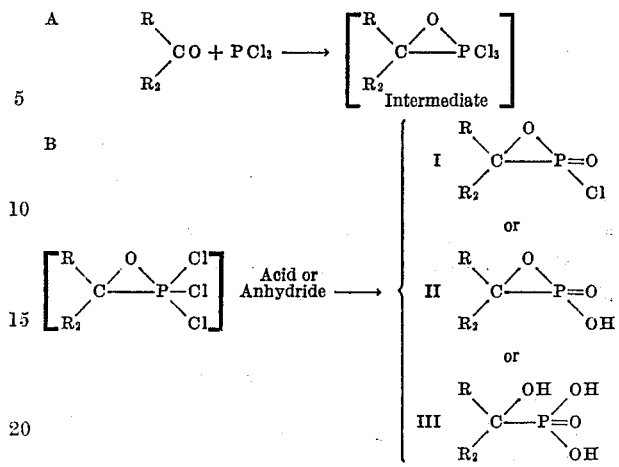

In Reaction B, the acid or anhydride is, of course, converted to the acid chloride. Among the acids and anhydrides which may be employed are acetic acid, acetic anhydride, and other carboxylic acids such as formic, oxalic, chloracetic, benzoic and the like. Compounds I and II represent partial conversion products and Compound III the final hydrolysis product. If desired, water may be added to the reaction mixture of B in order to increase the proportion of III, as for example by Reaction C.

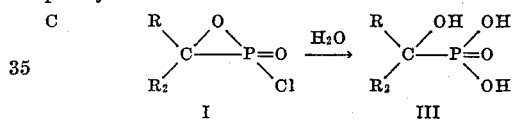

The application of heat and/or dehydrating agents to the products from Reaction B or C results in the formation of unsaturated phosphonic acids having the structural formula shown in Reaction D.

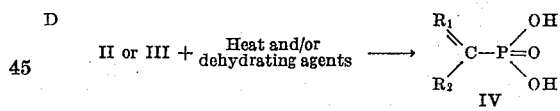

In the above reactions, R is a hydrocarbon radical such as alkyl, aryl-alkyl, naphthenyl or naphthenyl-alkyl, $R_1$ is equal to R less one hydrogen atom, and $R_2$ is hydrogen or aryl or a hydrocarbon radical. As a variation of Reaction D, the hydroxyl group of Compound III may be replaced by chlorine by treatment with hydrogen chloride and the product may be subjected to dehydrochlorination in order to obtain the Compound IV.

In the dehydration of the hydroxy phosphonic acids, esters or amides, the following reaction conditions may be employed: (1) heat to 120–140° C., (2) heat in the presence of silica gel catalyst, (3) superheated steam at 190° C., (4) acetic anhydride, (5) phosphorus pentachloride, (6) phosphorus pentabromide. In the use of (5) or (6), when operating on the hydroxy phosphonic acid, the acid chloride or bromide will be formed simultaneously during the dehydration. This, of course, may be used in preparing esters or amides.

The unsaturated phosphonic acid IV may be converted patrially or completely to an ester as illustrated by Reaction E.

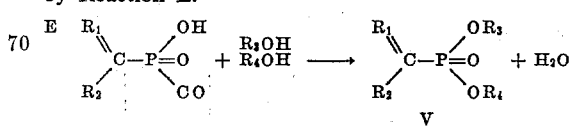

It will be understood that Reaction E is given only as an illustration of the esterification reaction, and that the invention relates to oil solutions of copolymers of compounds having the structure V. $R_3$ and $R_4$ are defined more completely below.

The order of preparation may, of course, be varied from the sequence shown in the equations above. The unsaturated phosphonic derivatives may also be prepared using an olefin as the starting organic material. The preparation of phosphonic acids from olefins generally follows the equations below:

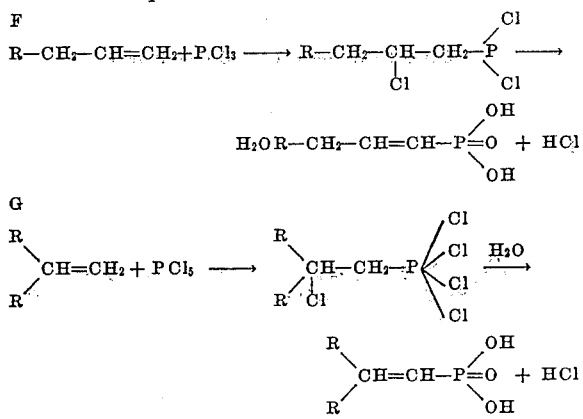

Suitable olefins for use in the above reactions are isobutylene, amylene, olefin polymers such as diisobutylene and polypropylene, cracked wax olefins, the olefins produced in the synthesis of hydrocarbons from carbon monoxide and hydrogen, etc. Such materials as styrene and its substituents may also be used. In general it is preferred to employ olefins which are unsymmetrical or branched such as diisobutylene, containing tertiary carbons, or which contain polymerization promoting groups such as phenyl, chlorine, etc., as it has been found that derivatives of long straight chain alpha olefins such as cetene are somewhat sluggish toward polymerization unless very favorable conditions are employed.

It has already been stated that the copolymers of the unsaturated phosphonic acid derivatives are especially useful as additives for lubricating oils, fuels, greases, coating compositions, and the like. In these applications it is necessary that the phosphonic compound be oil soluble, which requires that the groups $R_3$ and $R_4$ in Formula V contain sufficient hydrocarbon to cause oil solubility and preferably are alkyl groups containing from 10 to 20 carbon atoms.

The preferred average chain length of the solubilizing groups depends somewhat on the type of lubricating oil with which the product is to be used. For example, in the case of light oils of SAE-10 grade which have been heavily dewaxed to relatively low pour and cloud points, relatively straight chain solubilizing groups of $C_8$ and greater should average in the $C_{11}$ to $C_{14}$ range, whereas in the case of less dewaxing and higher pour and cloud points, an average of $C_{13}$ to $C_{16}$ may give the greatest pour point depression. It has also been found that somewhat different size groups are required if the groups are not straight chains, but are highly branched such as those derived from alcohols prepared by reacting polypropylene with carbon monoxide and hydrogen.

Among the compounds that are particularly useful in the formation of esters of phosphonic acids are alcohols having from 8 to 20 carbon atoms. One very suitable commercially available mixed alcohol for esterification of the phosphonic acid is a product obtained by hydrogeneration of coconut oil. Such a product is sold under the trade name "Lorol" and is a mixture of saturated straight chain alcohols ranging from 10 to 18 carbon atoms. Other related products are made by separating this material which may be considered as a crude mixture into several different fractions having a relatively higher proportion of the higher, lower, or medium constituent thereof. The composition of the "Lorol" per se and other related products "Lorol B" and "Lorol R" is approximately as follows:

|  | Lorol | Lorol B | Lorol R |
| --- | --- | --- | --- |
|  | Percent | Percent | Percent |
| $C_{10}$ | 4 | 3 | 1 |
| $C_{12}$ | 55.5 | 46 | 85 |
| $C_{14}$ | 22.5 | 24 | 13 |
| $C_{16}$ | 14 | 10 | 1 |
| $C_{18}$ | 4 | 17 |  |

Other alcohols which may be employed to esterify the unsaturated phosphonic acids are those prepared from olefins, CO and $H_2$ by the Oxo process, and those recovered as by-products from the synthesis of hydrocarbons from CO and $H_2$. Naphthenyl alcohols such as cyclohexanol, cyclohexyl ethanol, etc., are also suitable when the phosphonate contains relatively long aliphatic groups having 12 or more carbon atoms. Unsaturated alcohols containing one unsaturated bond per molecule can be employed, it generally being desirable in this case to esterify the acid after polymerization thus avoiding crosslinking of polymer chains and resultant oil insolubility.

The second monomer of the novel copolymers of invention has the following general formula:

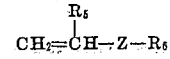

wherein $R_5$ is hydrogen, a methyl group, or a $$-CH_2COOR_7$$

group, $R_6$ is an alkyl group having from 1–4 carbon atoms and wherein Z is a carboxyl group. Materials covered by this type formula are esters of acrylic acid ($R_5$ is hydrogen, and Z is

esters of methacrylic acid ($R_5$ is methyl, and Z is

esters of itaconic acid ($R_5$ is $-CH_2COOR_7$, $R_7$ being a short chain alkyl group, and Z is

vinyl acetate ($R_5$ is hydrogen, Z is

and $R_6$ is a methyl group), and isopropenyl acetate ($R_5$ is a methyl group, Z is

and $R_6$ is a methyl group). The preferred embodiment contemplates the use of vinyl acetate.

The preferred monomer ratio used in the copolymerization reaction varies between about 1 to 10 parts by weight of the phosphonate to about 1 to 10 parts by weight of the unsaturated ester. The copolymerization is preferably carried out in the substantial absence of air and in the presence of a peroxide catalyst such as benzoyl peroxide. Temperatures within a range of from 40 to 150° C. may be used.

The invention will better be understood from the illustration of the following examples which are not to be construed as limiting the range of the present invention. The oils used in the following examples are mixtures of a solvent extracted Mid-Continent neutral plus a solvent extracted bright stock, test oil A being SAE 10 grade with +5° F. pour point, test oil B being SAE 10 grade with +15° F. pour point.

*Example I*

A 1-liter flask was charged with 137.5 g. of stearophenone (0.4 mol) and 66 g. of phosphorus trichloride (0.48 mol). The mixture was heated at 60–70° C. for a period of 10 hours. 44 additional grams of phosphorus trichloride were added at 50° C. followed by the addition of 48 g. of glacial acetic acid during one hour period. This mixture was then heated with stirring for 16 hours at 50° C. after which it was transferred to an evaporating dish and placed on a steam bath. The final traces of volatile material was removed in vacuo (70° C. at 0.1 mm. of mercury pressure). The resulting product was heated with dilute hydrogen chloride on a steam bath for two hours, water washed and dried. The phosphonic acid so obtained had a neutralization number of 250.3 and a molecular weight of 1700. This polymerized phosphonic acid lowered the pour point of test oil A from +5° F. to −10° F. when 1% was added.

*Example II*

A 5-liter flask was charged with 464.6 of acetone (8 mols) and 1231 g. of phosphorus trichloride (8.96 mols). The mixture was allowed to stand about 17 hours at room temperature, after which 1440 g. of glacial acetic acid were added during the course of 1 hour. The mixture was then stirred for one hour. At the end of this time the major part of the mixture was very viscous. A small amount of non-viscous supernatant liquor was decanted and an additional 600 g. of glacial acetic acid added. This mixture was then allowed to stand for an additional 3 hours after which it was saturated with dry hydrogen chloride and transferred to an evaporating dish and placed on the steam bath at 180° F. When substantially all of the acetic acid had been evaporated, the product was placed in a Claisen flask and the remainder of the acetic acid as well as all other volatile materials were removed in vacuo. The yield of unsaturated phosphonic acid was 1003 g. It had a bromine number of 93 (71% of theoretical amount) and a neutralization number of 963.

A 3-liter flask was charged with 280 g. of the phosphonic acid thus obtained, 830 g. of Lorol B alcohols and 800 cc. of naphtha. The mixture was heated so that the naphtha-water mixture was distilled and water removed. The naphtha was returned to the flask. A total of 71.5 cc. of water were thus obtained. The naphtha was then removed in vacuo. The product was the monomeric Lorol B ester of isopropenyl phosphonic acid. It had a saponification number of 189 and a viscosity of 45.9 Saybolt universal seconds at 210° F.

A 25 x 200 mm. test tube was charged with 25 g. of the above ester, air was displaced with nitrogen and 1.25 g. of powdered benzoyl peroxide added. The mixture again was blown with nitrogen until the peroxide dissolved. The tube was stoppered and placed in an oven at 60° C. for 66 hours. The resulting polymer had a viscosity of 116.7 S. U. S. at 210° F. This polymer lowered the pour point of test oil B from $+15°$ F. to $-15°$ F. when 0.2% was added thereto.

*Example III*

A 25 x 200 mm. test tube was charged with 20 g. of the ester monomer of Example II (Lorol B ester of isopropenyl phosphonic acid) and 5 g. of vinyl acetate. After displacing the air with nitrogen, 1.25 g. of powdered benzoyl peroxide were added and the mixture again blown with nitrogen until the peroxide was dissolved. The tube was stoppered and heated in an oven at 60° C. for 66 hours. The resulting copolymer had a viscosity at 210° F. of 344.4 S. U. S. This polymer when added to test oil A in 0.25% concentration, lowered the pour point from $+5°$ F. to $-10°$ F. and when added to test oil B in 0.2% concentration lowered the pour point from $+15°$ F. to $-5°$ F.

*Example IV*

A 25 x 200 mm. test tube was charged with 17.5 g. of the ester monomer of Example II (Lorol B ester of isopropenyl phosphonic acid) and 7.5 g. of vinyl acetate. The same general conditions and technique were employed as in Example III. A resulting copolymer having a viscosity of 299.3 S. U. S. was obtained. This copolymer lowered the pour point of test oil A from $+5°$ F. to $-10°$ F. and test oil B from $+15°$ F. to $-15°$ F when 0.2% was added.

*Example V*

A copolymer was prepared by heating 127.5 g. of the Lorol B ester of isopropenyl phosphonic acid with 22.5 g. of the butyl ester of itaconic acid for 25 hours at 80° C. in the presence of benzoyl peroxide polymerization catalyst. The copolymer so produced was an active pour point depressant, in 0.5% concentration reducing the ASTM pour point of a Pennsylvania 180 neutral oil from $+5°$ F. to $-15°$ F. and of test oil B from $+15°$ F to $-15°$ F.

*Example VI*

70 g. of product of Example I were dissolved in a benzene-naphtha solution with a water suspension of 25 g. of calcium hydroxide. After removal of the solvents, a salt was obtained which showed the following analysis:

| | per cent by weight |
|---|---|
| Calcium | 6.94 |
| Phosphorus | 7.52 |

This material lowered the pour point of test oil A from $+5°$ F. to $-35°$ F. when 1% was added.

This is a continuation-in-part of application Serial Number 52,424, now abandoned, filed for Dilworth T. Rogers and Jeffrey H. Bartlett on October 1, 1948.

What is claimed is:

1. A lubricating oil composition having improved low temperature properties which consists essentially of a major proportion of a mineral oil base stock and a minor but pour point depressing amount of a polymer formed by copolymerizing in the presence of a peroxide catalyst a material of the formula

wherein $R_1$ and $R_2$ are selected from the class consisting of hydrogen and a hydrocarbon radical and $R_3$ and $R_4$ are alkyl groups containing from 8 to 20 carbon atoms; with a material according to the formula

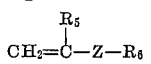

wherein $R_5$ is selected from the group consisting of hydrogen, methyl group and $-CH_2COOR_7$, $R_7$ being an alkyl group containing from 1 to 4 carbon atoms, and wherein $R_6$ is an alkyl group containing from 1 to 4 carbon atoms and wherein Z is a carboxyl group.

2. A lubricating oil according to claim 1 wherein $R_1$ and $R_2$ are methyl groups, $R_3$ and $R_4$ are alkyl groups containing from 10 to 20 carbon atoms per molecule.

3. A lubricating composition according to claim 1 wherein $R_1$ and $R_2$ are methyl groups, $R_3$ and $R_4$ are alkyl groups containing from 10 to 20 carbon atoms and wherein the second monomer is vinyl acetate.

4. A lubricating composition according to claim 1 wherein $R_1$ and $R_2$ are methyl groups, $R_3$ and $R_4$ are alkly groups corresponding to the mixture of alcohols obtained on the hydrogenation of coconut oil and having an average of 13.5 carbon atoms per molecule and wherein the second monomer is vinyl acetate.

5. A lubricating composition according to claim 1 wherein $R_1$ and $R_2$ are methyl groups, $R_3$ and $R_4$ are alkly groups corresponding to the mixture of alcohols obtained on the hydrogenation of coconut oil and having an average of 13.5 carbon atoms per molecule and wherein the second monomer is butyl itaconate.

References Cited in the file of this patent

UNITED STATES PATENTS

| Number | Name | Date |
|---|---|---|
| 2,365,466 | Hamilton | Dec. 19, 1944 |
| 2,439,214 | Lindsey | Apr. 6, 1948 |